US007453595B2

(12) United States Patent
Natori

(10) Patent No.: US 7,453,595 B2
(45) Date of Patent: Nov. 18, 2008

(54) PRINT CONTROL APPARATUS AND METHOD, COMPUTER PROGRAM, COMPUTER-READABLE STORAGE MEDIUM, PREVIEW APPARATUS AND METHOD, PRINTER DRIVER, AND PREVIEW METHOD THEREOF

(75) Inventor: Hideo Natori, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 1035 days.

(21) Appl. No.: 10/657,277

(22) Filed: Sep. 9, 2003

(65) Prior Publication Data

US 2004/0049741 A1    Mar. 11, 2004

(30) Foreign Application Priority Data

Sep. 9, 2002    (JP)    ............................. 2002-263218

(51) Int. Cl.
  *G06F 15/00*    (2006.01)
(52) U.S. Cl. ....................... 358/1.18; 358/1.2; 358/1.12; 358/448; 715/274; 715/276
(58) Field of Classification Search .................. 358/1.2, 358/1.12, 1.18, 448; 715/527, 274, 276
See application file for complete search history.

(56) References Cited

U.S. PATENT DOCUMENTS 6,429,947 B1 *    8/2002   Laverty et al. ............. 358/1.15

| | | | |
|---|---|---|---|
| 6,791,709 B1 * | 9/2004 | Nakamura et al. | ......... 358/1.18 |
| 7,064,858 B2 * | 6/2006 | Iwai et al. | ..................... 358/1.2 |
| 2003/0002056 A1 * | 1/2003 | Yamaguchi et al. | .......... 358/1.2 |
| 2003/0103221 A1 | 6/2003 | Natori | ......................... 358/1.9 |
| 2003/0103227 A1 * | 6/2003 | Tomomatsu | ............... 358/1.13 |

FOREIGN PATENT DOCUMENTS

JP    2001-067347    3/2001

* cited by examiner

*Primary Examiner*—Edward L Coles
*Assistant Examiner*—Chan S Park
(74) *Attorney, Agent, or Firm*—Fitzpatrick, Cella, Harper & Scinto

(57) ABSTRACT

Compatibility with an operating system is maintained, and a high-quality print image is efficiently previewed with a simple arrangement and small memory area. A printer driver program executed by a host computer (15) which controls the operation of a printer (7) adopts a processing arrangement in which a print processor (5) is interposed between a preview request from a previewer (8) and generation of image data by a printer graphic driver (6). This processing arrangement causes the printer graphic driver (6) to create image data for a preview display. The created image data is transferred to the previewer (8) in accordance with an instruction from the print processor (5).

21 Claims, 11 Drawing Sheets

FIG. 9

| FILE NUMBER | FILE NAME | PAGE NUMBER | RESOLUTION |
|---|---|---|---|
| 1 | CxxABC1.tmp | 1 | 96 |
| 2 | CxxXYZa.tmp | 1 | 200 |
| 3 | CxxXYZx.tmp | 2 | 96 |
| .. | .. | .. | .. |

800

PRINT CONTROL APPARATUS AND METHOD, COMPUTER PROGRAM, COMPUTER-READABLE STORAGE MEDIUM, PREVIEW APPARATUS AND METHOD, PRINTER DRIVER, AND PREVIEW METHOD THEREOF

CLAIM OF PRIORITY

The present application claims priority under 35 U.S.C. §119 from Japanese Patent Application No. 2002-263218, entitled "A Print Control Apparatus, and Method, A Computer Program, A Computer-Readable Recording Medium, A Preview Apparatus and Method, A Printer Driver and A Preview Method Thereof" and filed on Sep. 9, 2002, the entire contents of which are hereby incorporated by reference herein.

FIELD OF THE INVENTION

The present invention relates to the technical field of a print system having, e.g., a so-called preview function of displaying a print image so as to allow the user to see it before print processing.

BACKGROUND OF THE INVENTION

A technique of acquiring a print image and displaying it on the screen before printing has been proposed.

Conceivable examples of this technique are a method in which a computer (information processing apparatus) connected to a printer (to be also referred to as a "printing apparatus" hereinafter) analyzes a print command sent to the printer and maps an image for each of C, M, Y, and K planes to generate a print image, and a method in which a host computer that causes a printer to print transmits a print command to the printer, receives a print image created within the printer, and displays an image on the basis of the received print image.

In a network environment, conceivable examples are a method in which a so-called printer server in which a locally connected printer provides a printer function in the network environment analyzes a print command sent to the printer and maps an image for each of C, M, Y, and K planes to synthesize print images, and a method in which a print command is transmitted to a printer from a printer server via a network or from a host computer which requests the printer to print, and then the host computer receives via the network a print image created within the printer and displays an image on the basis of the received print image.

In a print system using a computer in which Microsoft Windows® is installed as an OS (Operating System), print data generated by an application program or the like is stored in an OS standard spool file, and print data stored in the spool file cannot be freely accessed. In the print system, the user interface driver of a printer driver activates a so-called previewer for displaying a print image on the computer in synchronism with the start of printing by an application program. The activated previewer waits until print data is actually printed. In the print system, the printer driver which creates a print image and the previewer which displays a print image cooperate with each other in actually printing print data, thus realizing the preview function. Such preview function is disclosed in U.S. patent Ser. No. 09/595,885 (filed on Jun. 20, 2000) and Japanese Patent Laid Open No. 2001-67347 (laid open to public on Mar. 16, 2001) by the assignee of the present application.

However, the above technique suffers the following problems which should be solved.

That is, in the method in which the host computer analyzes a print command sent to the printer and generates a print image, very accurate print image data can be obtained. However, the image data size increases in proportion to the printer resolution, requiring a large-capacity memory area.

In the method in which the host computer acquires a print image created by the printer from a print command, very accurate print image data can be obtained. However, the image data size increases in proportion to the printer resolution, requiring a large-capacity memory area.

In the print system using a computer in which Microsoft Windows® is installed as an OS (Operating System), the user interface driver of a printer driver activates a previewer for displaying a print image in synchronism with the start of printing by an application program. This method is compatible with the OS, but if a plurality of application programs print, a plurality of previewers are activated in accordance with the respective print operations.

In this OS, no application program is involved in re-printing in a print unit (to be referred to as a "print job" hereinafter) stored in a spool file. The printer driver cannot therefore activate any previewer.

In this OS, when it is so programmed as not to create any print data by an application program running on the OS, the printer driver activates the previewer in synchronism with the start of printing by the application program, but the application program does not create any print image. In this case, the previewer merely consumes the memory capacity (memory area) of the computer in execution, and no accurate print image can be displayed, giving the user a sense of incongruence.

SUMMARY OF THE INVENTION

The present invention has been made to overcome the above drawbacks, and has as its feature to provide a print control apparatus and method capable of maintaining compatibility with an operating system and efficiently previewing a high-quality print image with a simple arrangement and small memory area, a computer program, a computer-readable storage medium, a preview apparatus and method, and a printer driver and preview method thereof.

A print control apparatus according to the present invention is characterized by the following arrangement.

That is, a print control apparatus having a function for temporarily saving output intermediate data of document data in accordance with a document data print instruction is characterized by comprising an image data generator (6) configured to generate image data (bitmap data in the following embodiments) on the basis of the temporarily saved intermediate data, a previewer (8), when display of a print image of the document data is designated by the print instruction, configured to issue an image generation request in accordance with the print instruction, and displaying a preview window representing the print image of the document data on the basis of acquired preview display information, and a processing controller (5) configured to control the image generator so as to generate the image data in response to issuing of the image generation request, and configured to control the previewer so as to display a preview representing the print image, notifying the previewer of the preview display information based on the generated image data.

In a preferred aspect, the processing controller preferably controls a printing apparatus so as to generate the image data by the image data generator on the basis of the temporarily saved intermediate data and so as to print on the basis of the generated image data, in accordance with a print start request.

A print control apparatus which operates by a printer driver that supplies print data to a printing apparatus is characterized by comprising a print setting unit which designates whether to display a print image of document data on a screen, a page processor configured to generate print page data in accordance with a processing sequence of pages of the print data on the basis of setting by the print setting unit, an image generation processor configured to generate bitmap data of the print page data, and a print image display configured to display the bitmap data as the print image and switch a print image page to be displayed in accordance with user input operation, wherein when display designation of the print image is set by the print setting unit, the print page data is generated by the page processor in accordance with a request from the print image display, the bitmap data generated by the image generation processor using the generated print page data is stored in a print image file, and the print image display displays the print image on the screen by using the print image file.

Alternatively, a print control apparatus is characterized by comprising a user interface driver which starts operation in response to notification of a print event from a print function of an operating system that interprets a print command issued by an application program, a print processor which arranges print data of pages of print document data issued by the application program in a page description language for each page, a previewer which starts operation in response to activation by the print processor, and a printer graphic driver which generates image data, wherein the print processor activates the previewer in accordance with a driver property set along with acquisition of a print request for the print document data created by the application program, processes each page of the print document data to create print page data, and supplies the print page data to the printer graphic driver, the printer graphic driver stores, in a print image file, image data generated on the basis of the supplied print page data, and the previewer displays the image data stored in the print image file on a screen.

In another aspect of the present invention, a preview apparatus is characterized by comprising a preview image generator configured to generate a preview image stored in a creation preview file, a previewer configured to display the preview image stored in a reference file, and a replacement unit configured to store the preview image generated by the preview image generator in the creation preview file, and then replacing a content of the reference preview file designated by the previewer with a content of the creation preview file.

In still another aspect of the present invention, a printer driver which supplies print data to a printing apparatus is characterized by comprising previewer configured to display a preview on the basis of print data which is supplied from an application and spooled by a standard spool function of an operating system.

The present invention may be implemented by a method corresponding to the print control apparatus having each of the above arrangements, a method corresponding to the preview apparatus, and a method corresponding to the printer driver.

The present invention may also be implemented by program codes which cause a computer to realize the method corresponding to the print control apparatus having each of the above arrangements, the method corresponding to the preview apparatus, and the method corresponding to the printer driver, and a computer-readable storage medium which stores the program codes.

Other features and advantages of the present invention will be apparent from the following descriptions taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the descriptions, serve to explain the principle of the invention.

FIG. 9 is a table showing the data structure of a data table representing a registered reference preview file according to the second embodiment of the present invention.

DETAILED DESCRIPTION OF THE PREFERRED EMBODIMENTS

Preferred embodiments of a print system according to the present invention will be described in detail below with reference to the accompanying drawings.

In the following description, "documents" include graphical contents such as a figure, table, or bitmap image in addition to a text, or only graphical contents.

First Embodiment

Figure 1:
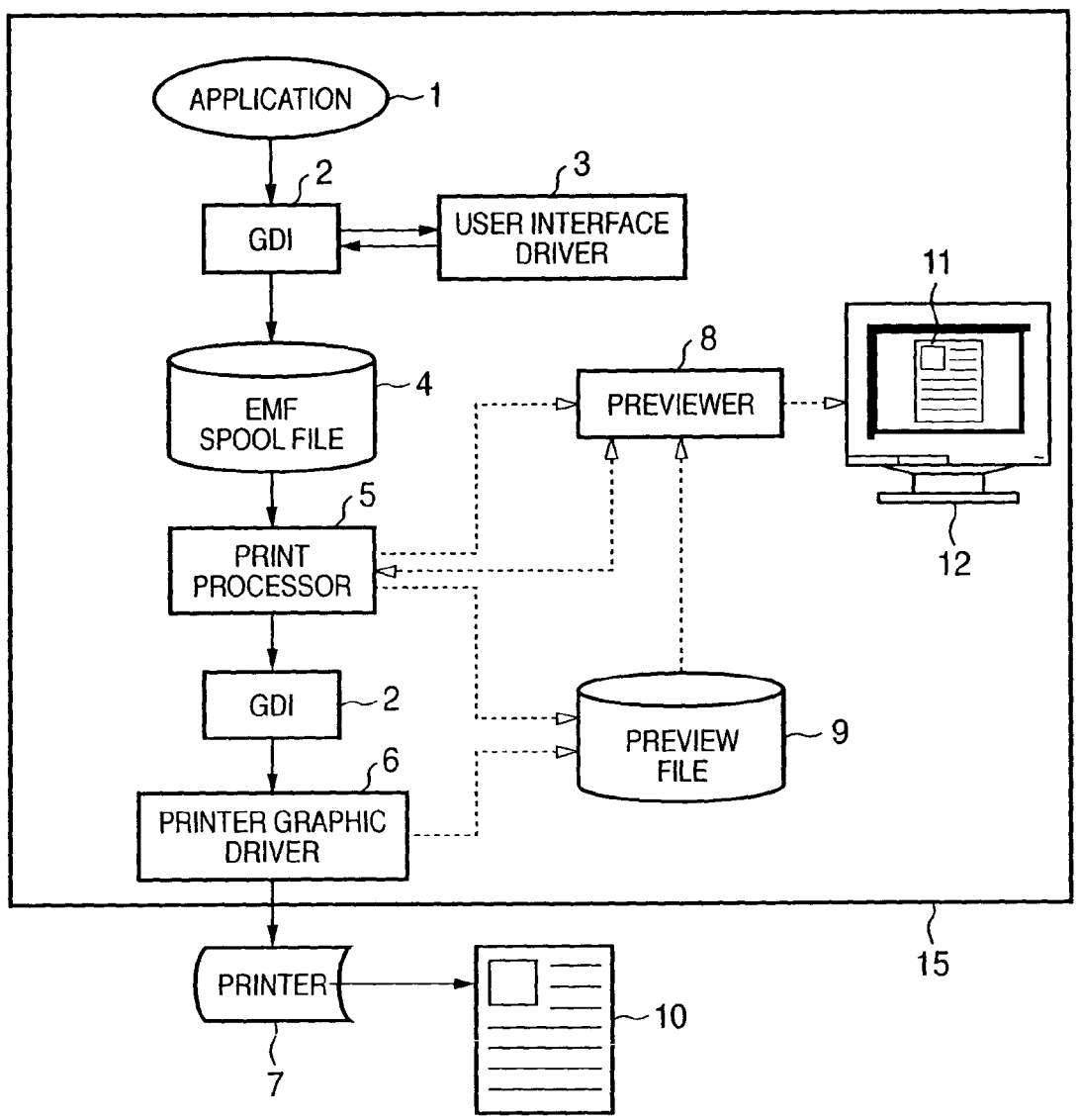
FIG. 1 is a block diagram showing a data flow when a print system according to the first embodiment of the present invention executes printing and a print preview.

FIG. 1 is a block diagram showing a data flow when a print system according to the first embodiment of the present invention executes printing and a print preview.

As shown in FIG. 1, the print system according to the first embodiment is constituted by a printer 7 and a host computer (computer) 15 serving as a print control apparatus. In the computer 15, Windows® available from Microsoft runs as an example of an OS (Operating System).

The computer 15 incorporates as modules (functional units) executed by a CPU (107 to be described later)

a previewer 8 which displays a print image on a display 12, a user interface driver 3 which realizes print setting operation by the user, a print processor 5 which has a function of activating the previewer 8 and performs print page processing, and a printer graphic driver 6 which performs generation processing of a print image to be printed by the printer 7.

The printer graphic driver 6 also has a function of transmitting generated print data to the printer 7 via the standard output function of the operating system and saving the print data as a file with a designated file name.

The printer graphic driver 6 can also generate print data in the bitmap data format or in a language processible by the printer 7. In displaying a preview, a preview file 9 as a print image file is temporarily created.

An example of the hardware arrangement of the print system which realizes the data flow shown in FIG. 1 will be described later with reference to FIG. 5.

The print system shown in FIG. 1 has a function of temporarily holding print data of a document created by an application (application program) 1 in the host computer 15 such as a personal computer, as intermediate print data (output intermediate data) in an EMF spool file 4 via a GDI 2, and converting the print data into bitmap data. The converted bitmap data is supplied from the host computer 15 to the printer 7 where the data is output as a document (10) printed on a print sheet.

In the first embodiment, the user interface driver 3, print processor 5, printer graphic driver 6, and previewer 8 are provided by a printer driver program which is supplied by a supplier (printer manufacturer in the first embodiment) other than an operating system supplier. In the following description, programs including the user interface driver 3, previewer 8, print processor 5, and printer graphic driver 6 will be generally called a "printer driver program".

The GDI (Graphic Device Interface) 2 is provided as a graphics engine of Windows® serving as an operating system. That is, the GDI 2 is a program module which performs graphics processing such as window display and printing in Windows®. The GDI 2 receives a command from the application 1, converts the command into a data format interpretable by a device driver such as the printer driver program, and then transmits the command to the device driver.

EMF is an abbreviation for Enhanced Meta File, and is a logical storage format of drawing data in Windows® serving as an OS. The EMF spool file 4 shown in FIG. 1 stores print data of a document in the EMF format. The print system of the first embodiment uses an OS standard spool function for a preview display (11) of the document on the display 12.

The user interface driver 3 provides a general setting function of setting the sheet size and print direction of a print sheet used for printing and other attributes. In addition, the user interface driver 3 according to the first embodiment comprises a print setting processor which provides the user with a preview setting function of determining whether to present a preview display (11) representing the print image of a document on the display 12 as shown in FIG. 1 before print processing in executing printing (in the first embodiment, a value set via the user interface driver 3 will be called a "print condition").

In the first embodiment, the user can set print conditions including whether to display a preview, by using the function provided by the print setting processor via a user interface window (not shown) displayed on the display 12 by the user interface driver 3. The preview setting is realized as, e.g., a flag representing whether "to display a preview" or "not to display a preview". In the following description, a state in which "display a preview" is set in the preview setting will be simply called "a preview is set".

When the user changes a print condition, the user interface driver 3 returns the changed print condition to the application 1 via the GDI 2. In the first embodiment, a preview is mainly set in print conditions. In other words, the preview setting contained in the print conditions is set to "display a preview".

The print conditions are stored as part of the EMF spool file 4 in a file device such as a magnetic disk (HDD 110 to be described later). The print conditions are referred to by the user interface driver 3, print processor 5, and the like.

<General Description of Preview Display Sequence>

Figure 2:
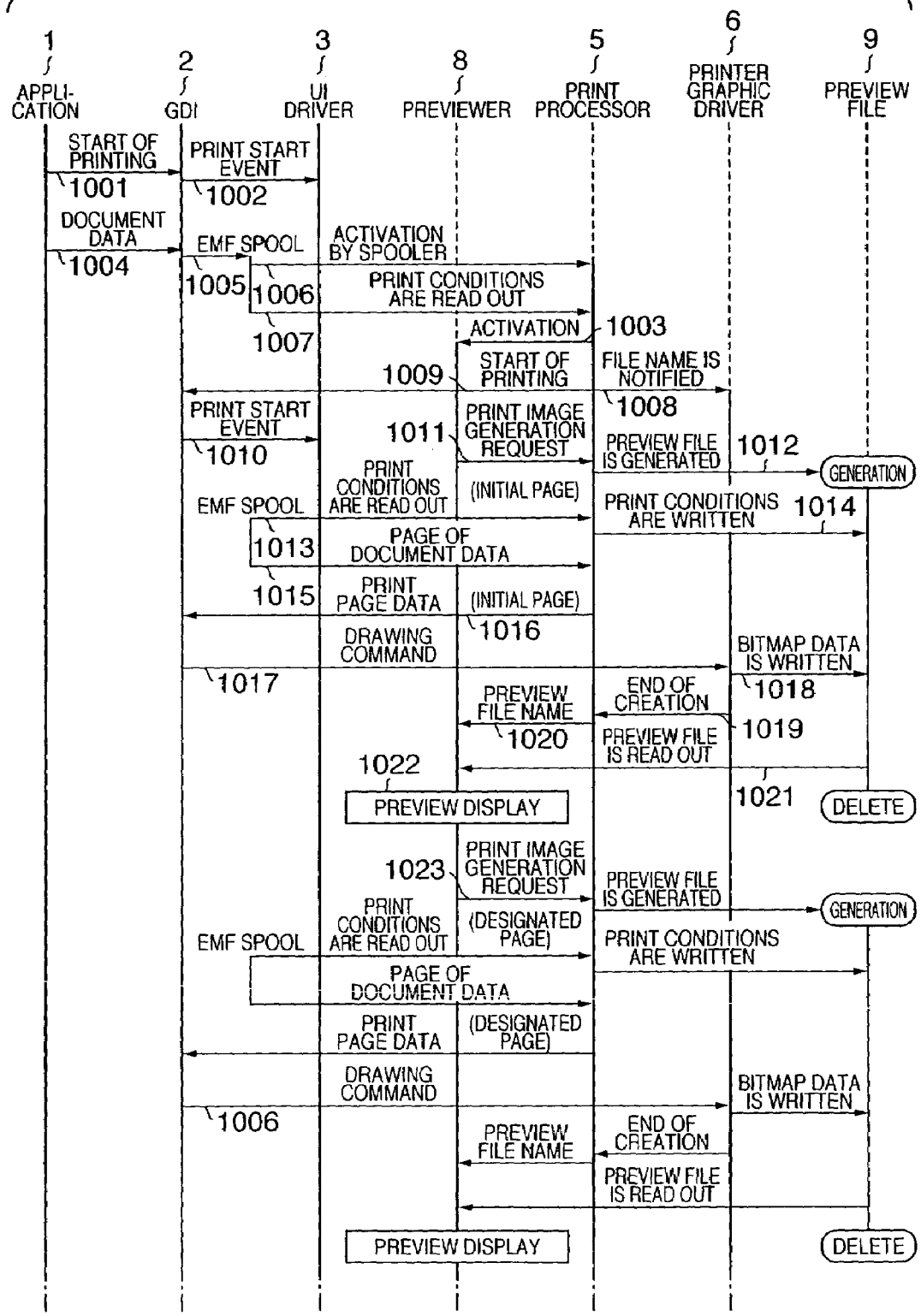
FIG. 2 is a view showing a processing sequence in the print system according to the first embodiment of the present invention.

FIG. 2 is a view showing a sequence in displaying previews of the first page and the next designated page in a document to be printed in the arrangement of FIG. 1. In the following description, parenthesized numbers denote reference numbers in FIG. 2.

Upon reception of an instruction to print a document from the operator or the user of another program, the application 1 notifies the OS print function via the GDI 2 of the start of printing in order to print the document (1001). At this time, the GDI 2 notifies the user interface driver 3 of a "print start" print event by the application 1 (1002).

Subsequently, the application 1 supplies print data of the document to the GDI 2 to continue print processing (1004). The print data via the GDI 2 is stored in the EMF spool file 4 (1005). When the first page of print data of the document is stored in the EMF spool file 4, the print processor 5 is activated by the OS standard spooler.

The print processor 5 is a module which creates print page data on the basis of print output information loaded from the EMF spool file 4 for each page in printing by Windows® and print data of the document, and supplies the generated print page data for each page to the printer graphic driver 6 via the GDI 2 to print.

Print page data is data of pages in the GDI command format that is obtained by rearranging, e.g., EMF data of pages read out from the EMF spool file 4. For example, EMF data of two pages read out from the EMF spool file 4 are arranged into print page data of one page, thereby realizing a generally called 2-up function.

In the first embodiment, the print processor 5 is a module having the above function, and also has a function as a print page processor. The print processor 5 communicates with the previewer 8 to acquire a print image creation request sent from the previewer 8. The print image creation request contains information such as a page number and resolution necessary to create a print image.

In the first embodiment, the resolution is a resolution or image size corresponding to the size of an image displayed on the display 12, or a resolution or image size corresponding to the display ability of the display 12. For example, to simultaneously display an entire A4-size portrait document on a screen of 1,600×1,200 pixels, an image having an A4 longitudinal length of about 1,200 dots at most must be generated. When this image is displayed on a 100-dpi display having 1,200 pixels in the vertical direction, a 1-page document is displayed in almost a full size. In this way, the size of image data to be generated is designated in accordance with the display ability. If a display in use is smaller in size, a smaller image size is designated in accordance with the display size. For a small display size, this size is designated as the size of an image to be generated.

If the print processor 5 having the above-mentioned functions is activated by the OS standard spooler (1006), the print processor 5 determines in accordance with print conditions (1007) read out from the EMF spool file 4 whether to display a preview. If the print conditions contain a setting "display a preview", the print processor 5 activates the previewer 8 (1003); otherwise, the print processor 5 performs general print processing without activating the previewer 8. A case wherein a preview is set will be explained.

As described above, in the first embodiment, a preview display is set. The print processor 5 determines the file name of the preview file 9, and notifies the printer graphic driver 6 via the GDI 2 of the file name and preview processing. At the same time, the print processor 5 requests the GDI 2 to start printing by the print processor 5 (1008 and 1009).

The print processor 5 creates an empty preview file 9 in response to acquisition of a print image creation request from the previewer 8 (1011 and 1012), and writes in the preview file 9 a page print condition corresponding to a page number whose preview is requested to be displayed (1013 and 1014).

The print processor 5 reads out from the EMF spool file 4 a document data page necessary to create a print image for a preview display (1015), creates print page data of the requested page number, and supplies it to the GDI 2 (1016).

In response to acquisition of the print start request by the print processor 5, the GDI 2 notifies the user interface driver 3 that the print event by the print Processor 5 has occurred (1010).

The printer graphic driver 6 serving as an image generator is a module which generates bitmap data from a graphic drawing command (1017) generated by the GDI 2 on the basis of the print page data supplied from the print processor 5. At this time, the printer graphic driver 6 additionally stores the bitmap data generated by the printer graphic driver 6 as preview image data in the preview file 9 by using the preview file name sent in advance from the print processor 5 (1018). After the requested preview image data is created, the printer graphic driver 6 notifies the print processor of a message to this effect (1019).

After the printer graphic driver 6 stores the preview image data, the print processor 5 sends back the file name of the preview file 9 to the previewer 8 (1020). The preview file 9 contains the print conditions stored by the print processor 5 and the preview image data stored by the printer graphic driver 6.

The processing sequence of the print processor 5 in performing a preview display and print processing will be described in detail with reference to FIGS. 3A and 3B.

The previewer 8 acquires preview image data corresponding to the requested page number and the print conditions of the page from the preview file 9 by using the preview file name acquired from the print processor 5 (1021). The preview display 11 is obtained on the display 12 serving as a display means (1022).

The previewer 8 repetitively communicates with the print processor 5 in order to acquire the next preview image to be displayed in accordance with user operation to a software button (to be referred to as a "button" hereinafter) 22 which is included in the user interface displayed at the upper portion of the preview display (previewer) 11 on a display window shown in FIG. 4 (1023). Print processing upon clicking of a button 20 will be described later.

Note that the preview file may be deleted upon preview, or one preview file may be kept used by overwriting file contents till the end of preview processing.

When the operator performs an operation of designating display of another page via the user interface shown in FIG. 4, the same sequence as step 1011 and subsequent steps described with reference to FIG. 2 is repeated.

In the first embodiment, preview image data for a preview display is generated by the printer graphic driver 6 in accordance with the above sequence. As a result, the first embodiment realizes generation of accurate preview image data using print data spooled by the operating system (i.e., preview image data capable of a preview display in the same format as that upon actual printing on a print sheet or the like).

Since preview image data is generated for each designated page, the memory area necessary to store preview image data can be reduced to an area for one page at most even for highest-resolution image data.

<General Description of Print Sequence>

A case wherein the user designates the start of printing on the previewer 8 (i.e., clicks the button 20) will be explained.

In this case, the previewer 8 requests the print processor 5 to start printing. In accordance with the print start request, the print processor 5 notifies the printer graphic driver 6 via the GDI 2 of actual printing. The print processor 5 reads out print data to be printed from the EMF spool file 4, creates print page data page by page from the start physical page to the final physical page, and sequentially supplies them to the GDI 2.

At this time, the printer graphic driver 6 which has been notified of actual printing generates bitmap data from a graphic drawing command generated by the GDI 2, unlike the above-mentioned case wherein preview image data for a preview display is generated. The printer graphic driver 6 converts the generated bitmap data into a print command, and supplies the print command to the printer 7 via a data transmission unit (in FIG. 5, an interface 114). The printer 7 serving as an output device has a function of printing on a print sheet a print command transferred from the printer graphic driver 6, and obtains a physical page (document 10 shown in FIG. 1) as a print result.

When the preview setting is set to "not display a preview", the previewer 8 is not activated. The print processor 5 requests the GDI 2 to start printing, and then reads out print data of the application 1 from the EMF spool file 4. The print processor 5 creates print page data page by page from the start physical page to the final physical page, and sequentially supplies them to the GDI 2. Printing is completed without any preview display.

<Processing by Print Processor 5>

Preview processing and print page processing realized by the print processor 5 according to the first embodiment will be described with reference to the flow chart of print page processing by the print processor 5 shown in FIGS. 3A and 3B.

Figure 3A:
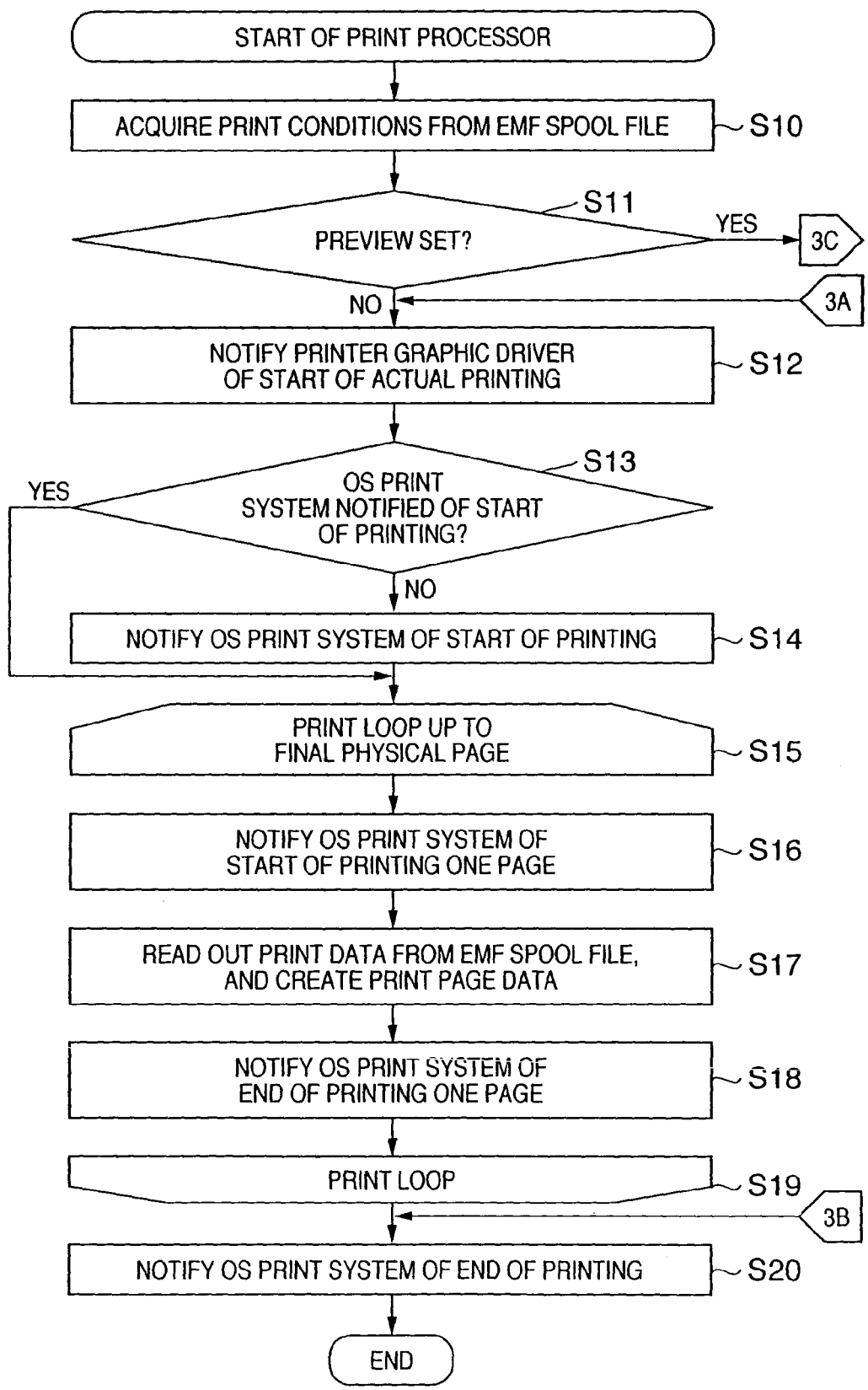
FIG. 3A is a flow chart showing page processing by a print processor 5 according to the first embodiment of the present invention.
Figure 3B:
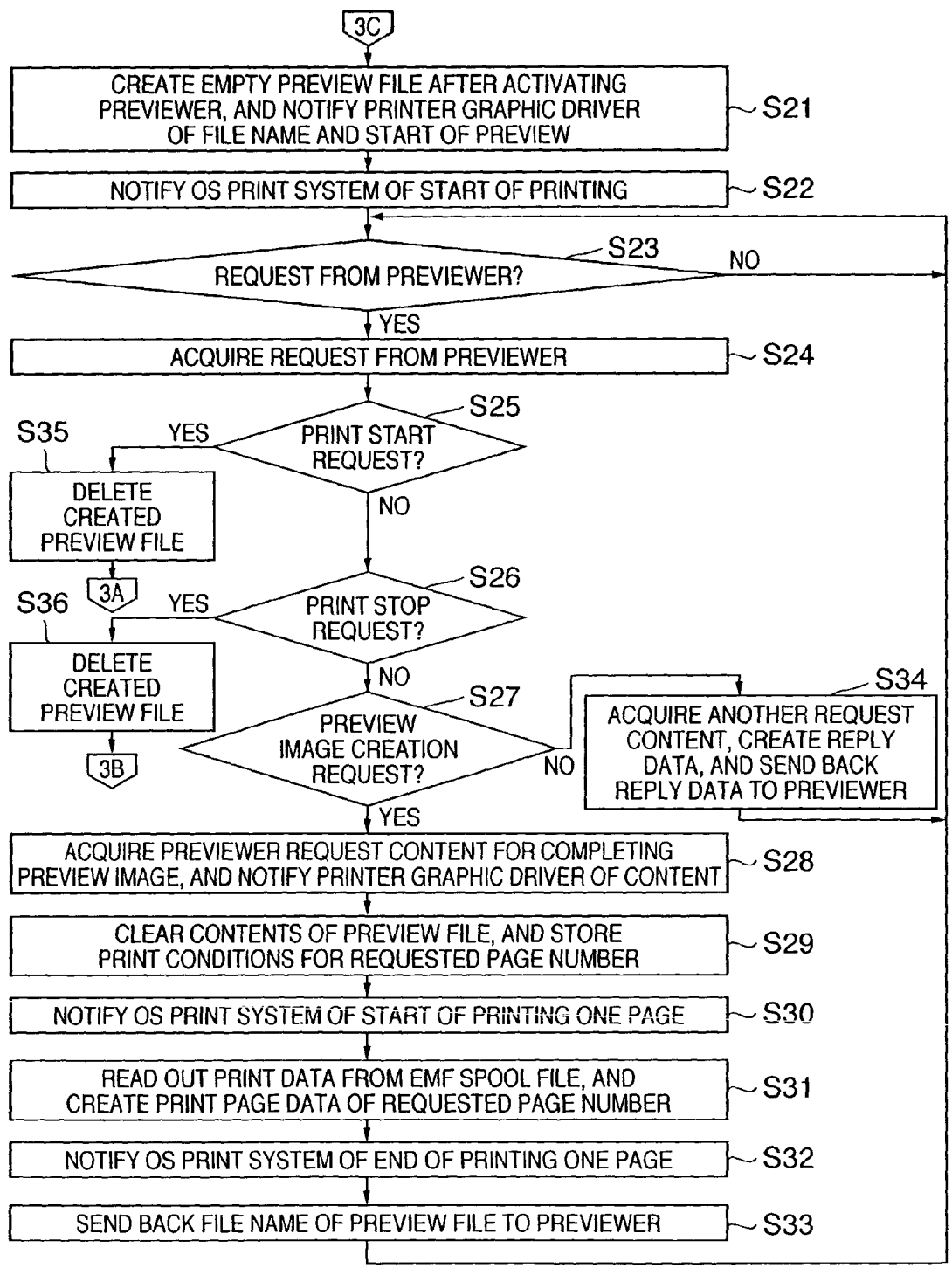
FIG. 3B is a flow chart showing page processing by the print processor 5 according to the first embodiment of the present invention.

If the application 1 starts print processing of a target document and at least one page of print data of the document is stored in the EMF spool file 4, the print processor 5 is activated from the OS standard spooler to start the processing sequence shown in FIGS. 3A and 3B. Print page processing by the print processor 5 shown in FIGS. 3A and 3B is executed for each print job.

The print processor 5 acquires the print conditions of the print job from the EMF spool file 4 in step S10, and determines in step S11 whether a preview is set in the acquired print conditions. If NO in step S11, the flow advances to step S12 in order to perform general printing; if YES, to step S21 in order to perform preview processing.

(Preview Processing)

In step S21, after the previewer 8 is activated, the print processor 5 creates an empty preview file 9 for storing a preview image and its print conditions, and notifies the printer graphic driver 6 of the file name.

In step S22, the print processor 5 notifies the OS print function (i.e., the GDI 2) of the start of printing.

In step S23, the print processor 5 waits for a request from the previewer 8. If a request is issued, the flow advances to step S24 to acquire the request from the previewer 8. The request can be realized as a message of a predetermined format for communication between processes.

In step S25, the print processor 5 determines the type of request from the previewer 8. If the request is a print start request, the flow advances to step S35 in order to perform general print processing; if NO, to step S26.

In step S35, the print processor 5 deletes the preview file 9 created in step S21, and advances to step S12 to perform general print processing.

In step S26, the print processor 5 determines the type of request from the previewer 8. If the request is a print stop request, the flow advances to step S36 in order to end print processing of the print job; if NO, to step S27.

In step S36, the print processor 5 deletes the preview file 9 created in step S21, and advances to step S20 to end print processing of the print job.

In step S27, the print processor 5 determines the type of request from the previewer 8. If the request is a preview image creation request, the flow advances to step S28 to perform preview image creation processing; if NO, to step S34 to perform another request processing.

In step S34, the print processor 5 executes processing corresponding to a request other than a print start request, print stop request, and preview image creation request out of types of requests from the previewer 8. For example, if the number of all printable pages (total number of pages) is requested, the print processor 5 prepares the number of all pages as a reply to the previewer 8. For example, if the request is an inquiry about whether print data of the application 1 is being spooled, the print processor 5 prepares a flag representing whether print data is being spooled, as a reply to the previewer 8. After the print processor 5 creates a reply suitable for a request, it sends the reply to the previewer 8. After the reply, the flow advances to step S23 to wait for a request from the previewer.

Figure 4:
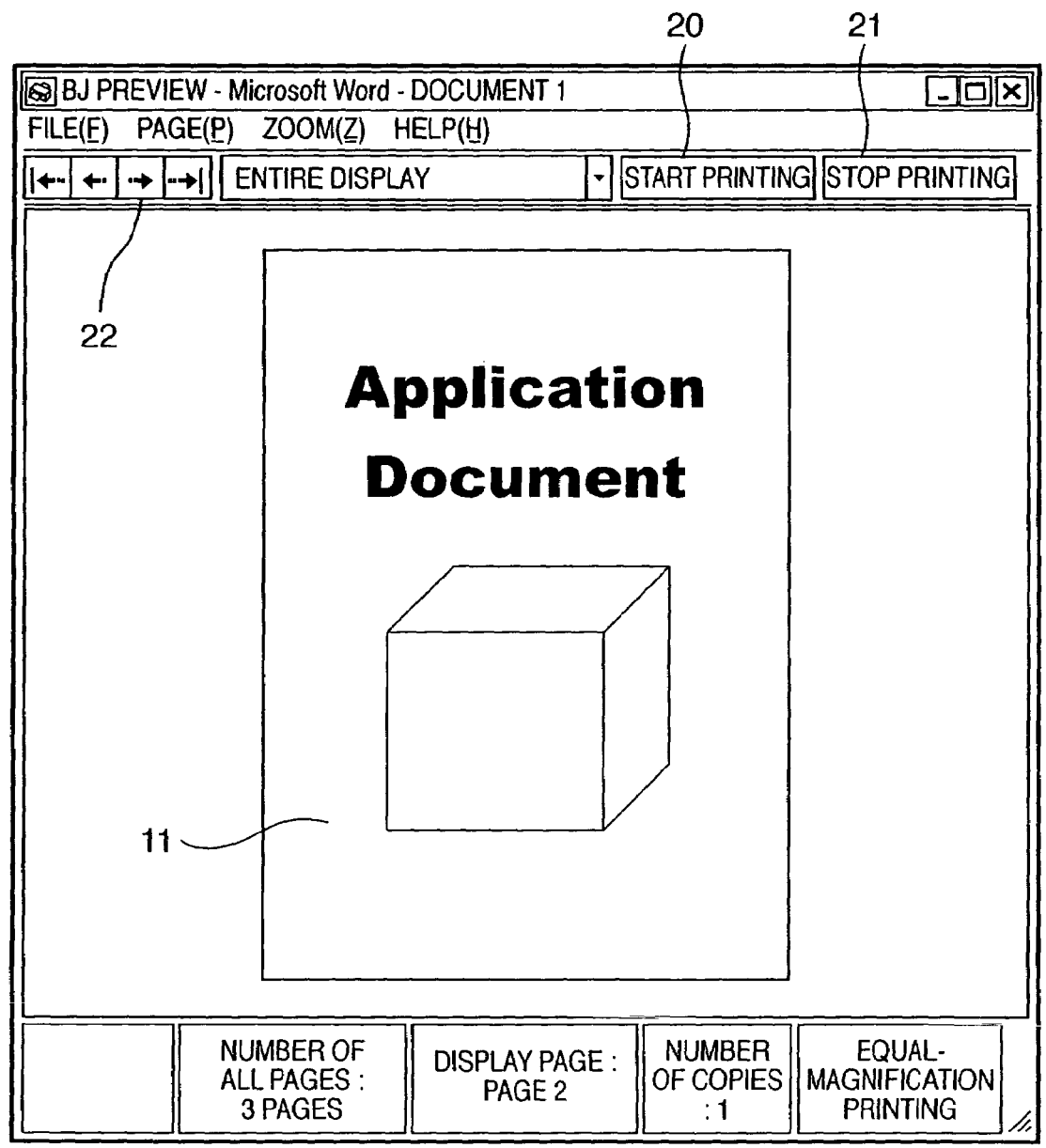
FIG. 4 is a view showing a display window (user interface) provided by a previewer 8 in the print system according to the first embodiment of the present invention.

The previewer 8 displays the number of all pages acquired in accordance with the request as the number of all pages (three pages in the example of FIG. 4) in a lower column on the display window shown in FIG. 4. If a button at the right end out of four buttons of the button 22 shown in FIG. 4 is clicked, the final page can be previewed because the number of all pages is known.

In step S28, the print processor 5 acquires a request content from the previewer 8 to obtain information necessary for preview image creation processing. For example, request content information sent from the previewer 8 contains the page number of print page data created by the print processor 5, the numbers of vertical and horizontal pixels of a created preview image, the resolution in creating a preview image, and the number of colors or subtractive process used for a created preview image. The request content may be any one of these pieces of information or a combination of pieces of information though the page number is indispensable. The print processor 5 notifies the printer graphic driver 6 of the acquired request content information.

In step S29, the print processor 5 clears the contents of the preview file 9, and then stores print conditions corresponding to print page data of the requested page number in the preview file 9.

In step S30, the print processor 5 notifies the OS print function via the GDI 2 of the start of printing one page.

In step S31, the print processor 5 creates print page data of the page number requested by the previewer 8 on the basis of print data read out from the EMF spool file 4, and transfers the print page data to the GDI 2.

In step S32, the print processor 5 notifies the OS print function via the GDI 2 of the end of printing one page. At this time, the GDI 2 creates a graphic drawing command from the print page data, and transfers the graphic drawing command to the printer graphic driver 6. The printer graphic driver 6 generates a bitmap image from the graphic drawing command received from the GDI 2, and additionally stores the bitmap image as a preview image in the preview file 9.

In step S33, the print processor 5 sends back the file name of the preview file 9 in response to a preview image creation request from the previewer 8. The flow advances to step S33 to wait for the next request from the previewer 8. The previewer 8 acquires the preview image of the designated page number from the preview file 9 having the file name sent back from the print processor 5 in step S33. The previewer 8 displays on the display 12 a display window including the user interface and preview display 11 shown in FIG. 4.

If the print processor 5 receives any request (page feed, print start operation, or print stop operation) from the previewer 8, the print processor 5 executes processing as described above in accordance with the request content.

(Print Processing)

In step S12, the print processor 5 notifies the printer graphic driver 6 of the start of actual printing in order to perform print processing.

In step S13, the print processor 5 determines whether the OS print function has already been notified of the start of printing. If YES in step S13, the flow advances to step S15 to print each page; if NO, to step S14 to notify the OS print function of the start of printing.

Processes from step S15 to step S19 constitute a loop for printing each physical page up to the final physical page to be printed. If all designated physical pages have not been printed in step S19, physical page print processing returns to step S16. If all designated physical pages have been printed, the flow advances to step S20 to notify the OS print function of the end of print processing.

In step S16, the print processor 5 notifies the OS print function of the start of printing one page.

In step S17, the print processor 5 reads out print data from the EMF spool file 4, and creates print page data corresponding to each physical page.

In step S18, the print processor 5 notifies the OS print function of the end of printing one page. The GDI 2 creates a graphic drawing command from print page data, and transfers the command to the printer graphic driver 6.

The printer graphic driver 6 is notified of actual print processing in step S12 and the end of printing one page in step S18, as described above. In response to this, the printer graphic driver 6 generates bitmap data from the print page data, and converts the generated bitmap data into a print command. The printer graphic driver 6 supplies the print command to the printer 7 via a predetermined data transmission means (interface 114 in FIG. 5), thereby printing the physical page of the target page.

In some cases, the printer graphic driver 6 can generate print data in a plurality of formats. The printer graphic driver 6 does not always generate print data in the bitmap format, and may generate print data in a language of a designated format. The generated print data is print data to be supplied to the printer, and in the first embodiment, a preview image is generated in the bitmap format.

In step S20, the print processor 5 notifies the OS print function of the end of printing, and ends the processing.

As described with reference to FIGS. 3A and 3B, the print processor 5 performs page processing.

<User Interface>

FIG. 4 is a view showing a display window (user interface) provided by the previewer 8 in the print function according to the first embodiment of the present invention.

As shown in FIG. 4, the previewer 8 serves as both a display area for displaying the preview display 11, the state of a print job, and the like, and an input means for allowing the user to change a preview image display method or the like. The preview image can be switched by clicking the button 22. Printing can be started with the button 20 and stopped with a button 21. The previewer 8 further includes a display window enlargement/reduction display designation column. The previewer 8 converts user operation to the display window (user interface) into a request corresponding to the operation, and notifies the print processor 5 of the request.

In the first embodiment, the display window shown in FIG. 4 is displayed upon reception of a print start instruction in a state in which a preview is set in the application 1. The first page to be previewed is, e.g., the first page in actually printing a document in accordance with the settings of print conditions, and the page number is always 1. For example, when reverse printing is set in the print conditions, a document is printed from its final page, and the preview image of page number 1 corresponds to the final page of the document.

The previewer 8 sets page number 1 as the first page to be previewed, and transfers the page number to the print processor 5 together with a preview image creation request. After that, the page number subjected to preview is incremented or decremented in accordance with clicking of the switching button 22. The previewer 8 transfers a preview image creation request to the print processor 5 together with the new page number.

In the example shown in FIG. 4, the page number cannot be directly designated. An input box for inputting a page number may be set to preview a page corresponding to a page number input to the input box.

If the print start button 20 is clicked, a print start request is issued to the print processor 5. This is processing corresponding to a print start request determined in step S25 of FIG. 3B.

If the print stop button 21 is clicked, a print stop request is issued to the print processor 5. This is processing corresponding to a print stop request determined in step S26 of FIG. 3B.

<Hardware Arrangement of Print System>

The hardware arrangement of the print system according to the first embodiment will be explained.

Figure 5:
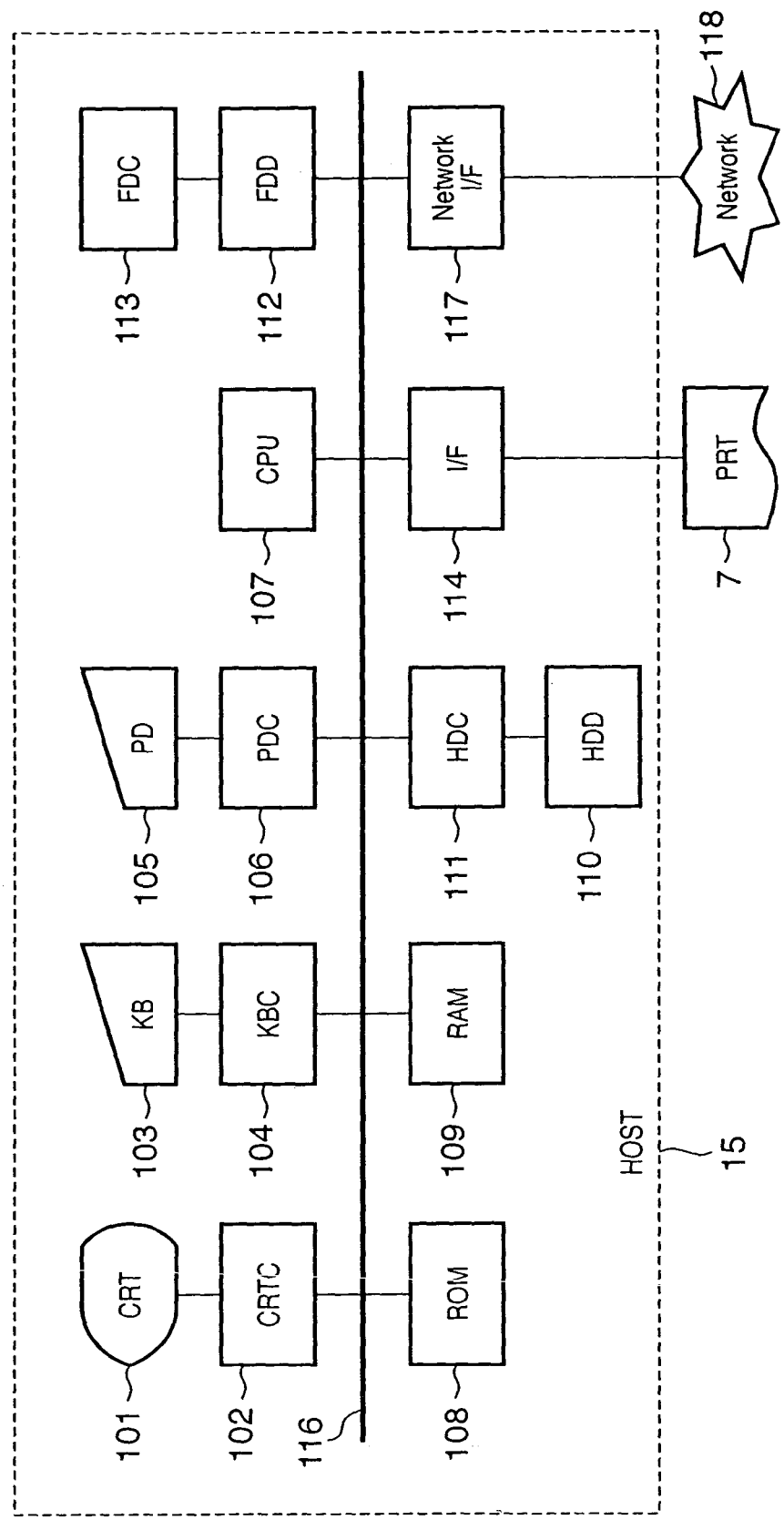
FIG. 5 is a block diagram showing the hardware arrangement of the print system according to the first embodiment of the present invention.

FIG. 5 is a block diagram showing the hardware arrangement of the print system according to the first embodiment of the present invention.

In FIG. 5, a CRT 101 represents the display 12, and displays a property setting window provided by the user interface driver shown in FIG. 1, the display window shown in FIG. 4, and the like. A CRTC 102 is a controller for the display device.

A KB 103 is a data input device such as a keyboard, and allows setting print conditions via, e.g., the user interface driver shown in FIG. 1. A KBC 104 is a keyboard controller.

A PD 105 is a coordinate input device such as a pointing device, and allows operation such as print stop operation via, e.g., the display window shown in FIG. 4. A PDC 106 is a pointing device controller.

The CPU 107 is a central processing unit which controls the overall apparatus. The processing sequence of the flow charts shown in FIGS. 3A and 3B is realized by executing a program for realizing the processing sequence by the CPU 107.

A ROM 108 is a read-only memory which stores a boot program and the like. A RAM 109 temporarily stores an OS, application programs, and a printer driver program such as the user interface driver 3, print processor 5 (FIGS. 3A and 3B), and printer graphic driver 6. The RAM 109 is also used as a work area.

An HDD 110 stores a commercially available OS (Operating System), application programs, the above-mentioned printer driver program, font data, a data file (preview file), an EMF spool file, and the like. An HDC 111 is a hard disk controller which controls the operation of the hard disk device.

An FDD 112 is a floppy® disk device as a driving device for a portable storage medium. An FDC 113 is a floppy® disk controller which controls the operation of the floppy® disk device.

An I/F 114 is an interface which connects the host computer 15 and printer 7, and is connected to, e.g., an inkjet printer 7 via an interface cable of a predetermined standard. Reference numeral 116 denotes a bus which connects each device; and 117, a network interface which connects the host computer 15 to a network 118.

When the host computer 15 having this device arrangement is powered on, the CPU 107 is activated in accordance with a boot program stored in the ROM 108, loads the OS from the HDD 110, and waits for operation by the operator. When a print instruction or printer driver print setting change instruction is received from the operator with the KB 103 or PD 105 via a running application 1, or the printer driver program is set to be automatically activated, the printer driver program such as the user interface driver 3, print processor 5, and printer graphic driver 6 which are stored in the HDD 110 is loaded to the RAM 109 and executed by the CPU 107.

As described with reference to the processing sequence shown in FIG. 2 and the flow charts shown in FIGS. 3A and 3B, the first embodiment adopts a processing arrangement in which the print processor 5 is interposed between a preview request from the previewer 8 and generation of image data by the printer graphic driver 6. This processing arrangement causes the printer graphic driver 6 to create image data for a preview display. The created image data is transferred to the previewer 8 in accordance with an instruction from the print processor 5. A preview image shown in FIG. 4 can be displayed on the display 12 without waiting for actual print processing of print data, unlike the prior art.

Preview image data capable of an accurate preview display in the same format as that upon actual printing on a print sheet or the like can be generated using the standard spool of the operating system. Since the OS standard spool is used, compatibility with the OS is high, and the printer driver program can be easily maintained for a long time, suppressing the development cost.

According to the first embodiment, no print image is reconstructed from a print command sent to the printer 7. The memory area necessary to store preview image data can be reduced to an area for one page at most even for highest-resolution image data, resulting in high memory use efficiency.

In the first embodiment, the print image resolution can be designated from the previewer 8, and a print image in a size suitable for display can be created to minimize the memory area for use.

According to the first embodiment, the previewer 8 is activated in executing print processing. A plurality of previewers are not activated, and the memory area used can be minimized. Even when a print job as a print unit stored in the spool file 4 is to be printed again, the previewer 8 can be reliably activated. When data is spooled in a data format incapable of a preview display, the previewer is not activated, and thus the user can be reliably provided with a review function.

Second Embodiment

The second embodiment based on the print system according to the first embodiment will be explained. In the following description, a repetitive description of the same arrangement as that of the first embodiment will be omitted, and the feature of the second embodiment will be mainly explained.

Figure 6:
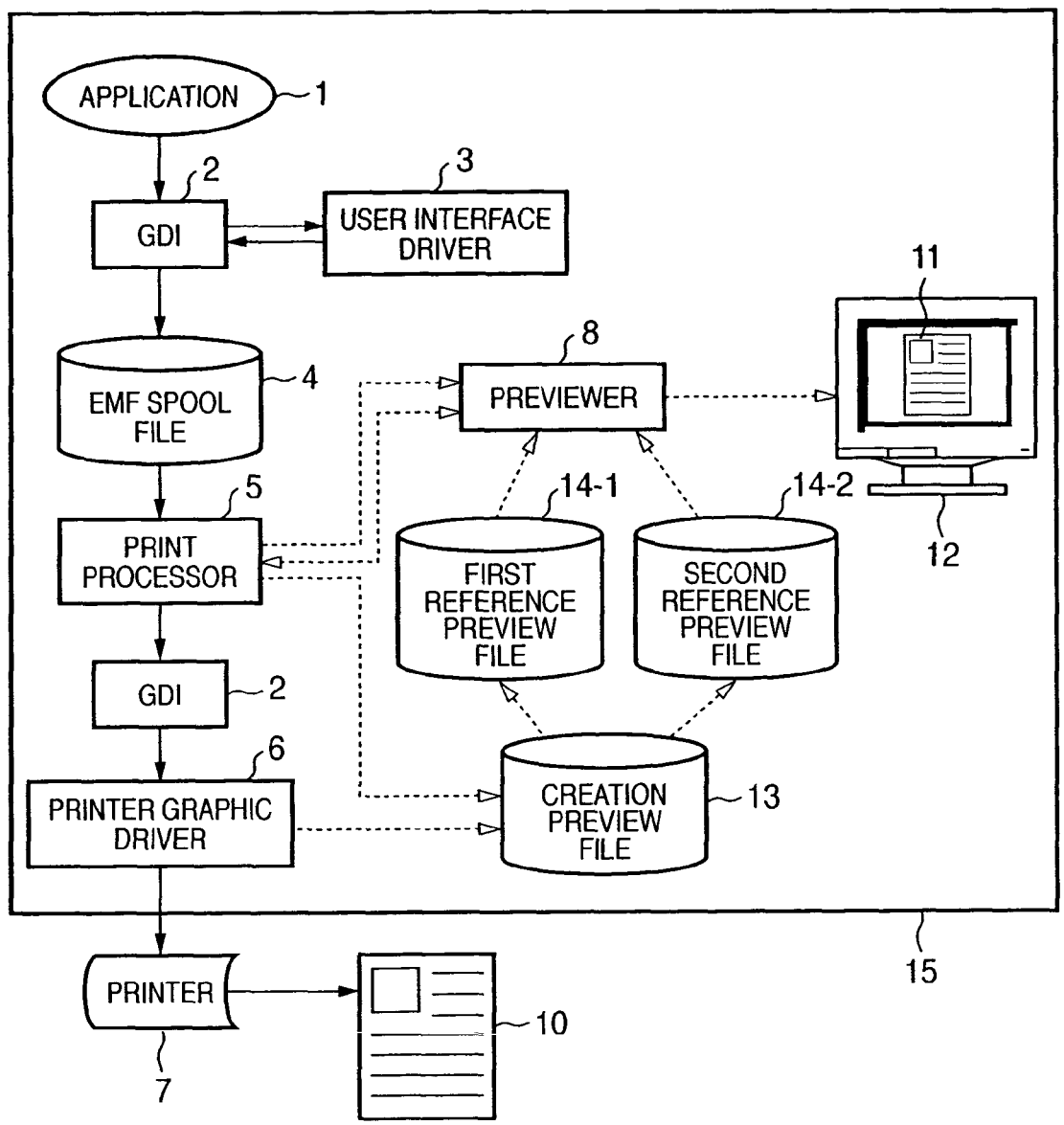
FIG. 6 is a block diagram showing a print system according to the second embodiment of the present invention.

FIG. 6 is a block diagram showing a data flow when a print system according to the second embodiment of the present invention executes printing and a print preview. The second embodiment corresponds to an example using a plurality of preview files in the print system described in the first embodiment.

Unlike the preview file 9 in the first embodiment (FIG. 1), the second embodiment adopts two types of preview files: one creation preview file 13 for allowing a print processor 5 to store print conditions and a printer graphic driver 6 to additionally store a preview image, and a plurality of reference preview files 14 (14-1 and 14-2) for allowing a previewer 8 to refer to a preview image and its print conditions.

The print processor 5 according to the second embodiment has a function of communicating with the previewer 8 and acquiring a page number as information for a preview image creation request and the number of reference preview files 14 and their file numbers (14-1 and 14-2) as information for a preview initialization request.

<General Description of Preview Display>

According to the second embodiment, in displaying a preview, preview processing is announced by notifying the printer graphic driver 6 via a GDI 2 of the file name of the creation preview file 13.

The print processor 5 which has received a preview request from the previewer 8 writes the print conditions of a page corresponding to the requested page number in the creation preview file 13. The print processor 5 reads out from an EMF spool file 4 a document data page necessary to create a print image, creates print page data of the requested page number, and supplies it to the GDI 2.

The printer graphic driver 6 serving as an image generator additionally stores generated bitmap data in the creation preview file 13 by using a file name sent in advance from the print processor 5.

After the printer graphic driver 6 stores the preview image in the creation preview file 13, the print processor 5 replaces the contents of a reference preview file 14 corresponding to the reference preview file number acquired from the previewer 8 with those of the creation preview file 13, and sends back the file name of the reference preview file 14 to the previewer 8. For example, if the number of the reference preview file 14 designated by the previewer 8 is 1, the print processor 5 replaces the contents of the first reference preview file 14-1, and sends back the file name of the first reference preview file 14-1 to the previewer 8. For example, if the number of the reference preview file 14 designated by the previewer 8 is 2, the print processor 5 replaces the contents of the second reference preview file 14-2 with those of the creation preview file 13, and sends back the file name of the second reference preview file 14-2 to the previewer 8.

The number of reference preview files is two in the second embodiment, but the description of the second embodiment also applies to one reference preview file or three or more reference preview files.

The previewer 8 acquires a preview image corresponding to the requested page number and the print conditions of the page by referring to the reference preview file 14 (14-1 or 14-2) having the file name sent back in response to the request to the print processor 5. The previewer 8 displays the acquired preview image on a display 12 in accordance with the print conditions to obtain a preview display 11 (e.g., FIG. 4).

The previewer 8 repetitively communicates with the print processor 5 in order to acquire the next preview image to be displayed in accordance with user operation to a user interface included in the display window shown in FIG. 4.

If the reference preview file 14 (14-1 or 14-2) including the next preview image to be displayed has already been created and exits, the preview image stored in the existing reference preview file 14 is reused without outputting a new request to the print processor 5. The print processor 5 may replace the contents of the reference preview file 14 with those of the creation preview file 13 by copying the file or renaming the file.

<Processing by Previewer 8>

Figure 8:
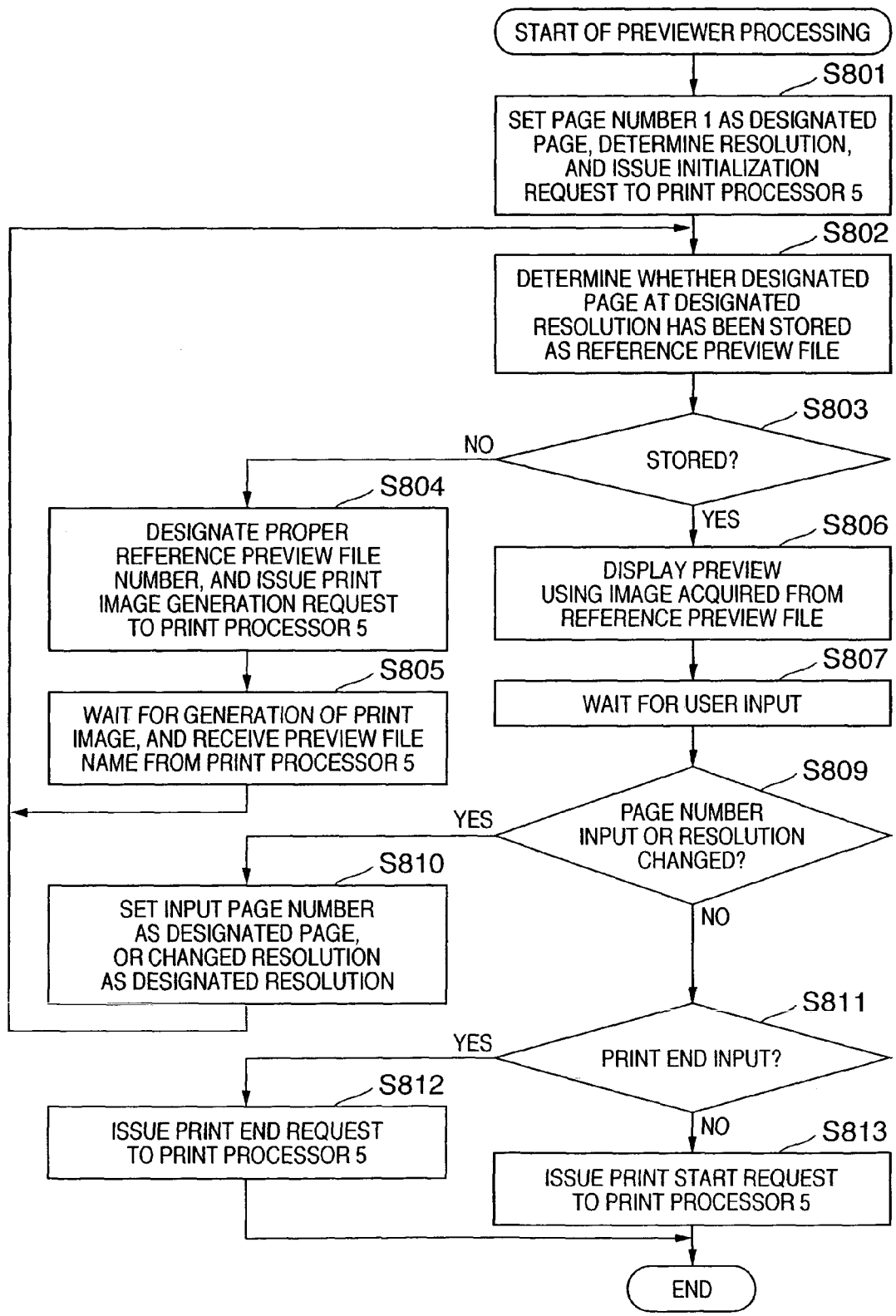
FIG. 8 is a flow chart showing processing by a previewer 8 according to the second embodiment of the present invention.

FIG. 8 is a flow chart showing processing by the previewer 8 according to the second embodiment of the present invention. The previewer 8 is activated by the print processor 5 to execute processing. Exchange of messages and data with the print processor 5 is the same as that described above, and a description thereof will be omitted.

In step S801, the page number of a preview image to be displayed is set to 1 as an initial value, and the resolution in issuing a print image generation request is determined. The previewer 8 issues an initialization request to the print processor 5.

In steps S802 and S803, the previewer 8 determines whether a designated page to be previewed has already been generated and stored in the reference preview file 14-1 or 14-2. This determination is performed by looking up a table (data table) having a data structure shown in FIG. 9.

FIG. 9 is a table showing the data structure of a data table representing a registered reference preview file according to the second embodiment of the present invention. In the second embodiment, for example, data of items "file name", "page number", and "resolution" are stored together with the file name (800). In step S803, the previewer 8 determines whether a designated page at a designated resolution has been registered. If a corresponding column is found in the table as a result of determination, the previewer 8 determines that a corresponding reference preview file exists.

If YES in step S803, the previewer 8 reads out image data from the reference preview file and displays the image data as a preview image in step S806. If NO in step S803, the previewer 8 designates the number of a reference preview file for storing image data to be generated in step S804. The previewer 8 issues a print image generation request for the designated page to the print processor 5.

If NO in step S803, the previewer 8 newly creates a preview file. If the disk space (memory area) of a host computer 15 is estimated to run short, the previewer 8 issues a reference preview file content delete request to the print processor 5 together with the number of an unnecessary reference preview file among reference preview files registered in the data table (table) shown in FIG. 9.

In step S806, a preview is displayed by the above-described sequence, and as a result, the display window shown in FIG.

4 is displayed on the display 12. At this time, the previewer 8 issues a print image generation request for the designated page to the print processor 5. After the previewer 8 receives a created reference preview file name from the print processor 5, the previewer 8 updates the data table shown in FIG. 9, and displays a preview by the procedure of step S802.

After the preview is displayed, the previewer 8 waits for user input operation to the user interface included in the display window shown in FIG. 4 in steps S807 and S809. If the previewer 8 detects input operation, it determines whether the operation is to change the designated page or designated resolution. If YES in step S809, the previewer 8 changes the page number or resolution in step S810, and advances to step S802 in order to switch the preview display.

If NO in step S809, the previewer 8 determines in step S811 whether user input operation is print end operation. If YES in step S811, the previewer 8 issues a print end request to the print processor 5 in step S812. If NO in step S811, the previewer 8 issues a print start request to the print processor 5 in step S813

<Processing by Print Processor 5>

Page processing by the print processor 5 according to the second embodiment will be described with reference to the flow chart of print page processing by the print processor 5 shown in FIGS. 7A and 7B.

Figure 7A:
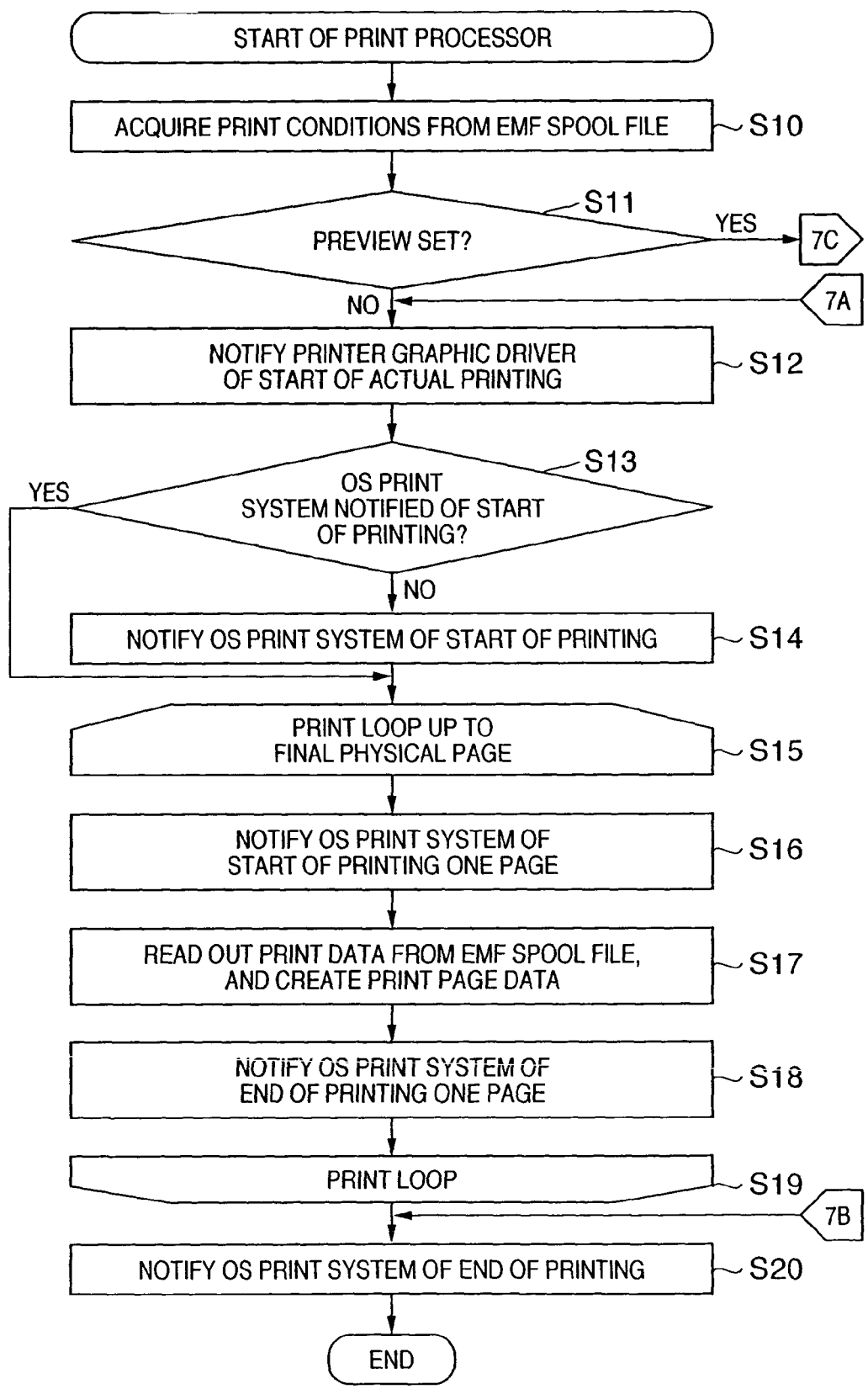
FIG. 7A is a flow chart showing page processing by a print processor 5 according to the second embodiment of the present invention.
Figure 7B:
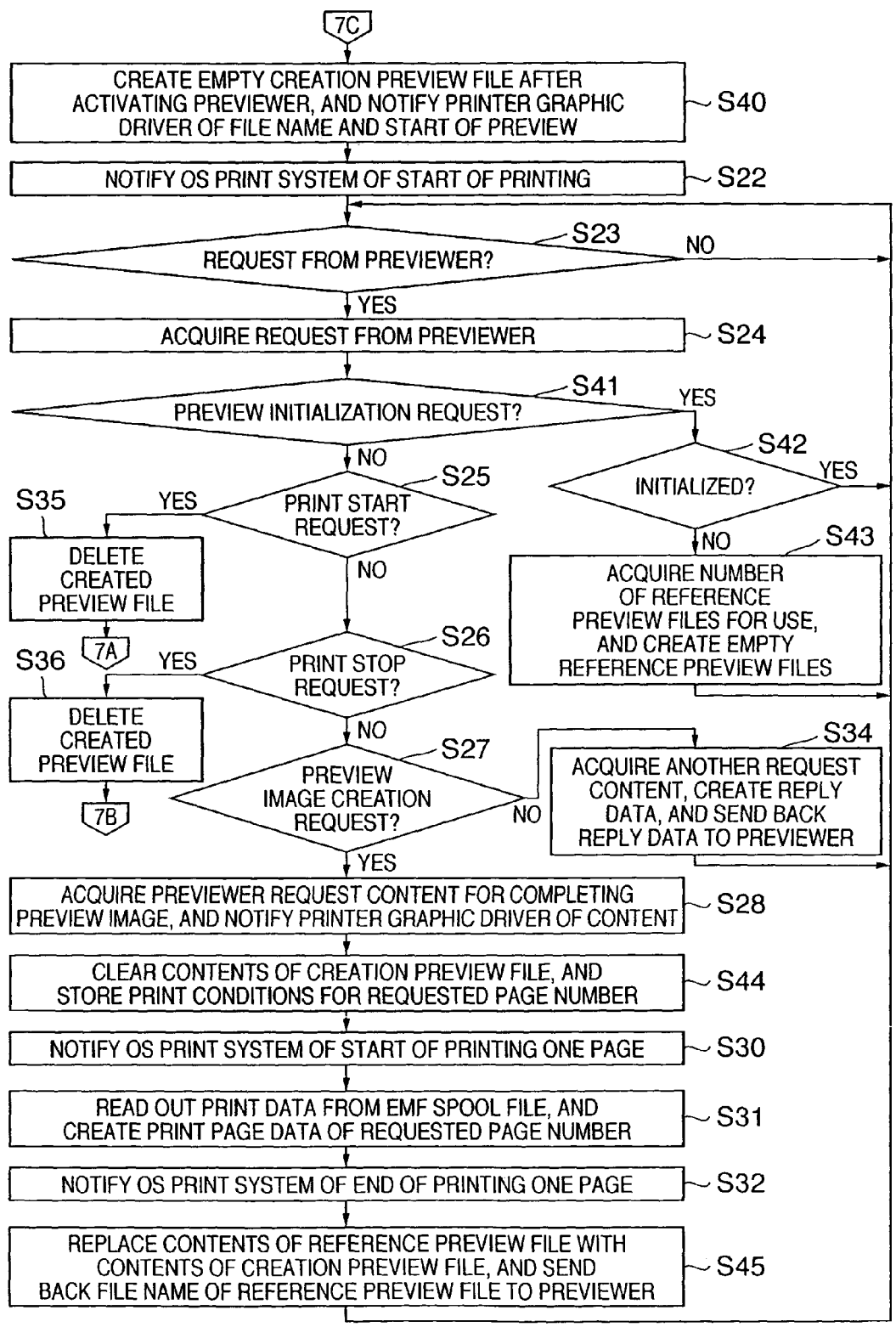
FIG. 7B is a flow chart showing page processing by the print processor 5 according to the second embodiment of the present invention.

FIGS. 7A and 7B are flow charts showing page processing by the print processor 5 according to the second embodiment of the present invention. Processing steps denoted by the same reference numerals as those in the flow charts shown in FIGS. 3A and 3B according to the first embodiment are steps of performing processes with the same contents as those of steps denoted by the same reference numerals in FIGS. 3A and 3B, and a repetitive detailed description thereof will be omitted. Processing steps unique to the second embodiment are steps S40 to S45.

In the second embodiment, page processing by the print processor 5 is executed for each print job. The print processor 5 acquires the print conditions of the print job from the EMF spool file 4 in step S10, and determines in step S11 whether a preview is set in the print conditions. If NO in step S11, the flow advances to step S12 in order to perform general printing; if YES, to step S40 in order to perform preview processing.

In step S40, the print processor 5 creates an empty creation preview file 13 for storing a preview image and its print conditions, and notifies the printer graphic driver 6 of the file name. The print processor 5 notifies the OS print function of the start of printing in step S22, and waits for a request from the previewer 8 in step S23. In step S23, the print processor 5 waits for a request from the previewer 8, and if a request is issued, advances to step S24 to acquire the request from the previewer.

In step S41, the print processor 5 determines the type of request acquired from the previewer 8. If the request is a preview initialization request, the flow advances to step S42 to determine initialization processing; if NO, to step S25.

In step S42, the print processor 5 determines whether initialization processing has already been performed. If YES in step S42, the flow advances to step S23 to wait for a request from the previewer 8; if NO, to step S43 to perform initialization processing.

In step S43, the print processor 5 acquires the number of reference preview files 14 to be used from the request content from the previewer 8 as initialization processing of the reference preview files 14. The print processor 5 creates a requested number of empty reference preview files 14. After that, the flow advances to step S23 to wait for a request from the previewer 8. In initialization processing of step S43, the table (data table) shown in FIG. 9 is also initialized by updating columns corresponding to initialized files by, e.g., null data.

In step S25, the print processor 5 determines the type of request from the previewer 8. If the request is a print start request, the flow advances to step S35 in order to perform general print processing; if NO, to step S26. In step S35, the print processor 5 deletes the preview file created in step S21, and advances to step S12 to perform general print processing.

In step S26, the print processor 5 determines the type of request from the previewer 8. If the request is a print end request, the flow advances to step S36 in order to end print processing of the print job; if NO, to step S27.

In step S36, the print processor 5 deletes the preview file created in step S21, and advances to step S20 to end print processing of the print job.

In step S27, the print processor 5 determines the type of request from the previewer 8. If the request is a preview image creation request, the flow advances to step S28 to perform preview image creation processing; if NO, to step S34 to perform another request processing.

In step S34, the print processor 5 executes processing corresponding to a request other than a print start request, print end request, and preview image creation request out of types of requests from the previewer 8. For example, if the number of all printable pages is requested, the print processor 5 prepares the number of all pages as a reply to the previewer 8. For example, if the request is an inquiry about whether print data of the application 1 is being spooled, the print processor 5 prepares a flag representing whether print data is being spooled, as a reply to the previewer 8. After the print processor 5 creates a reply suitable for a request, it sends back the reply to the previewer 8. After the reply, the flow advances to step S23 to wait for a request from the previewer.

For example, if the request is a reference preview file content delete request, the print processor 5 clears the contents of a reference preview file having a designated file number, and notifies the previewer 8 of the completion of work as a reply. At this time, the table (data table) shown in FIG. 9 is also initialized by updating a column corresponding to the cleared file by, e.g., null data.

In step S28, the print processor 5 acquires a request content from the previewer 8 to obtain information necessary for preview image creation processing. For example, the request content sent from the previewer 8 includes the page number of print page data created by the print processor 5, the numbers of vertical and horizontal pixels of a created preview image, the resolution in creating a preview image, the number of colors or subtractive process used for a created preview image, and the number of a reference preview file 14 for storing a newly created preview image.

The print processor 5 notifies the printer graphic driver 6 of the acquired request content information.

In step S44, the print processor 5 clears the contents of the creation preview file 13, and stores print conditions corresponding to print page data of a requested page number in the creation preview file 13.

In step S30, the print processor 5 notifies the OS print function of the start of printing one page. In step S31, the print processor 5 reads out print data from the EMF spool file 4, and creates print page data of the page number requested by the previewer 8.

In step S32, the print processor 5 notifies the OS print function of the end of printing one page. At this time, the printer graphic driver 6 generates a bitmap image from the print page data created in step S31, and additionally stores the bitmap image as a preview image in the creation preview file 13.

In step S45, the print processor 5 replaces the contents of the reference preview file 14 having the requested number with those of the completed creation preview file 13. The print processor 5 sends back the file name of the reference preview file 14 having the requested number as a reply to the preview image creation request from the previewer 8. The flow advances to step S23 to wait for a request from the previewer 8. If the contents of the creation preview file 13 are cleared after the contents of the reference preview file 14 are replaced with those of the creation preview file 13, the memory capacity used can be further reduced. The previewer 8 registers the received file name of the reference preview file, the resolution of a preview target, and the page number of the preview target in correspondence with each other in the table (data table) shown in FIG. 9.

Also in the second embodiment, steps S12 to S20 show the sequence of actual print processing. These steps are the same as those in FIGS. 3A and 3B described in the first embodiment, and a repetitive description thereof will be omitted.

In this fashion, page processing by the print processor 5 shown in FIGS. 7A and 7B ends.

In the second embodiment, every time the print processor 5 creates print page data and notifies the OS print function of the end of printing one page in step S32, the printer graphic driver 6 generates bitmap data from the created print page data. The generated bitmap data is additionally stored as a preview image in the creation preview file 13 having a file name notified in step S21. In step S33, the print processor 5 replaces the contents of the reference preview file 14 with those of the creation preview file 13. The print processor 5 sends back the file name of the reference preview file 14 to the previewer 8. In response to this, the previewer 8 acquires the preview image of the reference preview file 14 from the file name sent from the print processor 5, and displays the preview image on the display 12.

As for the created reference preview file, for example, the maximum number of creatable reference preview files is defined in advance in the previewer 8. If the number of reference preview files exceeds the maximum number in step S804 of FIG. 8, the contents of a designated number of reference preview files are initialized sequentially from a reference preview file which has been created earliest, thus reusing the initialized reference preview files. This can suppress the memory area to a predetermined size. In this case, if the user can designate the maximum number, the number of files can be set in accordance with a usable memory area.

The number of files can be designated by the user by preparing an input box or selection menu on, e.g., a display window (user interface) shown in FIG. 4 so as to allow the user to input the number of files. An input value is stored as the maximum number of reference preview files in a memory, magnetic disk, or the like, and is referred to in step S804. At this time, the column of an initialized file is initialized in accordance with the file entity from a preview page table 800 which is referred to by the previewer 8.

The second embodiment has described an example characterized by using a plurality of reference preview files 14 to be referred to by the previewer 8, and further using the creation preview file 13 for storing print conditions and a preview image by the print processor 5 and printer graphic driver 6.

In addition to the effects of the first embodiment, the previewer 8 can reuse a preview image created in the past by storing it in the reference preview file 14-1 or 14-2. The memory area used can be minimized, and a print preview can be efficiently displayed without any processing load of causing the print processor 5 and printer graphic driver 6 to regenerate the same image.

The present invention described by exemplifying the above embodiments may be applied to a system including a plurality of devices or an apparatus formed from a single device.

As has been described above, the present invention can realize a print control apparatus and method capable of maintaining compatibility with an operating system and efficiently previewing a high-quality print image with a simple arrangement and small memory area, a computer program, a computer-readable storage medium, a preview apparatus and method, and a printer driver and preview method thereof.

The present invention is also achieved by supplying a software program which realizes the functions of the flow charts described in the above embodiments directly or from a remote place to a system or apparatus which operates as the host computer 15, and reading out and executing the supplied program codes by the computer of the system or apparatus. In this case, the software need not be a program as far as it has a program function.

The present invention is therefore realized by program codes installed in the computer in order to realize functional processing of the present invention by the computer. That is, the claims of the present invention include a computer program for realizing functional processing of the present invention.

In this case, the present invention can take any program form such as an object code, a program executed by an interpreter, or script data supplied to an OS as long as a program function is attained.

A recording medium for supplying the program includes a flexible disk, hard disk, optical disk, magnetooptical disk, MO, CD-ROM, CD-R, CD-RW, magnetic tape, nonvolatile memory card, ROM, and DVD (DVD-ROM and DVD-R).

As another program supply method, the program can be supplied by connecting a client computer to an Internet homepage via the browser of the client computer, and downloading the computer program of the present invention or a compressed file containing an automatic installing function from the homepage to a recording medium such as a hard disk. The program can also be realized by grouping program codes which constitute the program of the present invention into a plurality of files, and downloading the files from different homepages. That is, the claims of the present invention also include a WWW (World Wide Web) server which allows a plurality of users to download the program files for realizing functional processing of the present invention by a computer.

The program of the present invention can be encrypted, stored in a storage medium such as a CD-ROM, and distributed to the user. A user who satisfies predetermined conditions is caused to download decryption key information from a homepage via the Internet. The user executes the encrypted program by using the key information, and installs the program in the computer.

The functions of the above-described embodiments are realized when the computer executes the readout program. Also, the functions of the above-described embodiments are realized when an OS or the like running on the computer performs part or all of actual processing on the basis of the instructions of the program.

Furthermore, the functions of the above-described embodiments are implemented when the program read out from the recording medium is written in the memory of a function expansion board inserted into the computer or the memory of a function expansion unit connected to the computer, the CPU of the function expansion board or function expansion unit performs part or all of actual processing on the basis of the instructions of the program.

The present invention is not limited to the above embodiments and various changes and modifications can be made within the spirit and scope of the present invention. Therefore, to apprise the public of the scope of the present invention, the following claims are made.

What is claimed is:

1. A print control apparatus which uses a spooler to receive print data and temporarily save the print data as intermediate data in accordance with a document data print instruction, comprising:
   a previewer configured to read out image data that is generated based on the intermediate data and perform a preview operation; and
   a print processor configured to activate said previewer if a preview operation is designated when said print processor is activated by the spooler, generate a preview file in response to issuing of an image generation request by said previewer, cause an image data generator to save the image data generated based on the intermediate data in the preview file, and notify said previewer of a file identifier of said preview file,
   wherein said previewer reads out the image data based on the file identifier sent by said print processor, and performs the preview operation.

2. The apparatus according to claim 1, wherein
   the image generation request issued by said previewer includes designation information on a size or resolution of image data to be generated, and
   said print processor controls said image data generator so as to generate the image data at the size or resolution designated by the designation information.

3. The apparatus according to claim 1, wherein
   the image generation request issued by said previewer includes page number information on a total number of pages of image data to be generated, and
   said print processor controls the image data generator so as to generate image data corresponding to a page number designated by the page number information.

4. The apparatus according to claim 1, wherein a print image file storing bitmap data convertible to a print command is generated from the intermediate data, and the image generation request issued by said previewer includes the number of colors used for the bitmap data stored in the print image file, or a subtractive process used to create the bitmap data.

5. The apparatus according to claim 1, wherein
   the print data comprises designated print data designated by a user to be printed,
   the image data read out by said previewer corresponds to designated print data,
   said print processor creates a designated number of preview files for saving the generated image data generated by the image data generator, and stores preview display information based on the generated image data in at least one of the preview files, and
   when preview display is designated by a print instruction and preview display information corresponding to the designated print data is stored in one of the preview files, said previewer displays a preview window representing an image of the print data on the basis of the information read out from the one of the preview files.

6. The apparatus according to claim 1, wherein when said previewer issues an inquiry about whether the print data to be printed is temporarily saved as the intermediate data, said print processor sends a reply to the inquiry.

7. The apparatus according to claim 6, wherein when said previewer issues an inquiry about a total number of pages in actually printing a target document data, said print processor sends a reply to the inquiry.

8. The apparatus according to claim 1, wherein said print processor controls a printing apparatus so as to print the print data in accordance with a print start request.

9. A print control method of controlling an apparatus which uses a spooler to receive print data and temporarily to save the print data as intermediate data in accordance with a document data print instruction, comprising:
   an activating step of activating a previewer if set to a preview display of image data that is generated based on the intermediate data when a print processor is activated by the spooler;
   a processing step of generating a preview file in response to the issuing of an image generation request by the previewer, causing an image data generator to save the image data generated based on the intermediate data in the preview file, and notifying the previewer of a file identifier of the preview file in response to an image generation request from the previewer activated in said activating step;
   a reading step of reading the image data from the preview file based upon the file identifier; and
   a displaying step of displaying the image data.

10. The method according to claim 9, wherein in said processing step, the image data generator generates the image data at a designated size or resolution.

11. The method according to claim 9, wherein in said processing step, the image data generator generates image data corresponding to a page number designated by a total number of pages to be printed as an image data generation object based on the intermediate data.

12. The method according to claim 9, wherein a print image file storing bitmap data convertible to a print command is generated from the intermediate data, and in said processing step, the image generation request issued by the previewer includes a designated number of colors used for the bitmap data stored in the print image file or a subtractive process used to create the bitmap data.

13. The method according to claim 9, wherein
   the print data comprises designated print data designated by a user to be printed,
   the image data read out by said previewer corresponds to designated print data,
   in said processing step, a designated number of preview files for saving the image data generated by the image data generator is created to store the generated image data in one of the preview files, and
   in the displaying step, when image data corresponding to the designated print data is stored in one of the preview files, a preview window representing an image of the print data is displayed on the basis of the image data read out from the one of the preview files.

14. A computer program stored on a computer-readable medium, for print control operating under an operating system included in a computer, which uses a spooler provided by the operating system to receive print data and for temporarily storing the print data as intermediate data to be output, said program enabling a computer to perform a method comprising:

an activating step of activating a previewer if set to preview display of image data that is generated based on the intermediate data when a print processor is activated by the spooler;

a processing step of generating a preview file in response to the issuing of an image generation request by the previewer, causing an image data generator to save the image data generated based on the intermediate data in the preview file, and notifying the previewer of a file identifier of the preview file in response to an image generation request from the previewer activated in said activating step;

a reading step of reading the image data from the preview file based upon the file identifier; and a displaying step of displaying the image data.

15. The computer program according to claim 14, wherein the image generation request issued by the previewer includes designation information on a size or resolution of image data to be generated, and in said processing step the image data generator generates the image data at the size or resolution designated by the designation information.

16. The computer program according to claim 14, wherein the image generation request issued by the previewer includes page number information on a total number of pages of image data to be generated, and in said processing step the image data generator generates image data corresponding to a page number designated by the page number information.

17. The computer program according to claim 14, wherein a print image file storing bitmap data convertible to a print command is generated from the intermediate data, and the image generation request issued by the previewer includes the number of colors used for the bitmap data stored in the print image file, or a subtractive process used to create the bitmap data.

18. The computer program according to claim 14, wherein the print data comprises designated print data designated by a user to be printed, the image data read out by said previewer corresponds to designated print data, in said processing step a designated number of preview files for saving the image data generated by the image data generator are created to store the generated image data in one of the preview files, and the displaying step is executed to, when image data corresponding to the designated print data is stored in one of the preview files, display a preview window representing an image of the print data on the basis of the image data read out from one of the preview files.

19. The computer program according to claim 14, wherein said processing step is executed to, when the previewer issues an inquiry about whether print data to be printed is temporarily saved as the intermediate data, send a reply to the inquiry.

20. The computer program according to claim 19, wherein said processing step is executed to, when the previewer issues an inquiry about a total number of pages in actually printing the target document data, send a reply to the inquiry.

21. The computer program according to claim 14, wherein said processing step is executed to control so as to generate the image data by the image data generator on the basis of the temporarily saved intermediate data in accordance with a print start request, and control a printing apparatus so as to print on the basis of the generated image data.

* * * * *